United States Patent Office 2,752,665
Patented July 3, 1956

2,752,665
GRAIN STABILIZED METALS AND ALLOYS

Johann S. Streicher, East Orange, N. J., assignor to Baker & Co., Inc., Newark, N. J., a corporation of New Jersey No Drawing. Application April 21, 1950,
Serial No. 157,407

22 Claims. (Cl. 29—182)

This invention relates to grain stabilized metals and alloys. More particularly the present invention relates to grain stabilized platinum and platinum alloys or metals of the platinum group, such as iridium, osmium, palladium, rhodium, and ruthenium, and to alloys in which any of these metals forms the principal ingredient. The invention also relates to articles made from such metals or alloys for high temperature use, such as catalysts, furnace heating elements, thermocouple wires, ignition wire, platinum ware, electric contact points and the like.

The present invention is particularly applicable to the following metals and alloys: platinum, iridium, osmium, palladium, rhodium, ruthenium, alloys of platinum and rhodium containing up to 50% of rhodium, alloys of platinum and iridium containing up to 30% of iridium, alloys of platinum and wolfram containing up to 6% of wolfram, alloys of platinum and nickel containing up to 6% of nickel, alloys of platinum and ruthenium containing up to 11% of ruthenium, alloys of platinum, palladium and ruthenium containing 77% to 10% platinum, 13 to 88% palladium, and 10 to 2% ruthenium, and alloys of palladium and ruthenium containing up to 8% ruthenium.

Generally, the platinum metals and their alloys are manufactured from constituents which have been refined to a high degree of purity. Inherent in such high purity metal is the tendency that the compacted metals, compacted either by means of fusion, or by means of the powder metal methods, change easily during use under sustained high heat from an original fine-grained structure into a more or less coarse-grained structure due to sudden disorderly and exaggerated grain growth. Such excessive grain growth at high and very high temperatures is often followed by sudden mechanical deterioration, cracks, etc., making the fabricated article useless.

Exaggerated grain growth originating in small grained pure platinum metal or platinum metal alloy as a result of sustained high heat is caused either by the fact that during such sustained heat accidental heterogeneous inclusions, such as alkali salts of various kinds, are suddenly released from grain boundaries or, that such release from grain boundaries of inclusions of minor, accidental and irregular type is effected by the combined action of high heat and of highly active gases from the surrounding atmosphere (water vapor, hydrogen, etc.) upon grain boundaries, or, that in presence of excessive heat the high purity metals combine chemically with traces of base metal vapors which happen to be produced accidentally or otherwise through the action of reducing gases upon the operating system, and, that through such "getter action" critical strains at crystal boundaries arise which make the adjoining crystals grow larger and larger.

Since it was found that the mechanical deterioration of the highly refined platinum metals and platinum metal alloys during sustained and excessive heating was produced and caused the same way as the deterioration of pure wolfram (tungsten) during high temperature use, and since the difficulties with wolfram (tungsten) were satisfactorily overcome, a long time ago, by means of incorporation of basic metal oxides, such as the alkaline earth oxides, alumina, zirconia, the rare earth metal oxides, but especially by means of the rare earth metal oxide, thoria, the incorporation of the above specified metal oxides into the pure platinum metals and platinum metal alloys was also suggested, and thoria incorporation is preferably used as grain stabilizer with the platinum metals and the platinum metal alloys. With wolfram (tungsten) the preferred thoria content is about 0.75% per weight of metal; with higher thoria contents difficulties were found in mechanically working the wolfram (tungsten) compacts. With platinum metals and platinum metal alloys the thoria content is specified as from 0.01% to 10% per weight of metal; however, the practical range is specified as from 0.01% upwards but less than 1% per weight of metal. In order to keep the platinum metals and alloys with certainty outside the range where swaging, rolling or drawing difficulties arise, the preferred range of from about 0.15 to 0.50% per weight of metal is applied, and about 0.25% thoria per weight of metal is claimed as the most useful case, which is substantially reduced compared with about 0.75% thoria per weight of metal for the best case with wolfram (tungsten).

The special effect of grain stabilization of wolfram (tungsten) as accomplished by means of thoria and similar highly refractory oxides of the basic oxide type is based upon the fact that only these oxides are able to stand the temperatures at which wolfram (tungsten) wires are operated, and only these oxides stay put at the grain boundary surfaces at these high temperatures. Wolfram (tungsten) wires can be manufactured only by means of the old Wollaston powder metal method. Therefore, the only way of incorporating the thoria into such metal compacts is by way of the powder metal method. The grain stabilization procedure of platinum metals and platinum metal alloys by means of thoria and similar highly refractory materials of the basic metal oxide type follow strictly the lines as found useful with wolfram (tungsten), with regard to manufacturing the metal compacts as well as with regard to incorporating the basic metal oxides, since it was found that no other method but the old Wollaston powder metal method would allow the incorporation of the thoria or any other basic metal oxides which are related to thoria chemically and which share its high grade refractory properties, that is, they fuse at temperatures far above platinum metals and platinum metal alloys.

It has now been found that in contrast to the method of effecting grain stabilization by means of thoria and similar basic metal oxides which have refractory properties close to thoria, a superior type of grain stabilization is accomplished with platinum metals and platinum metal alloys by means of silica (silicon oxide, $SiO_2$) which is practically at the same level as platinum and palladium and the majority of the useful alloys of the platinum metal group with regard to refractory properties since silica fuses at 1730° C.

However, silica is, in contrast to thoria a strictly acidic oxide. Within the group of acidic oxides it has practically the highest refractory properties, but sufficient to effect grain stabilization with the platinum metals and the platinum metal alloys under the circumstances under which these metals and alloys are used. Silica produces the grain stabilization of these metals and alloys with a power about four times greater than that of thoria, figured per unit weight of metal. Due to this extraordinary superior power with which silica is able to act as grain stabilizer with the platinum metals and the platinum metal alloys, grain stabilization by means of silica can be accomplished over a very wide range, not only with relatively small amounts of silica but even with minute amounts of silica, such as with about 0.001 to 2.5% silica per weight of metal. However, it was found, an upper limit of practical usefulness of the silicating procedure is reached between the range of up to about 0.3 to 0.5% $SiO_2$ per weight of metal, and, the preferred range which assures best fabricating results with regard to swaging, rolling, drawing, fine wire drawing, etc. requires only up to about 0.20% $SiO_2$ per weight of metal. Using the silica grain stabilizer it is of great interest that it acts in substantial strength using the small amounts, such as from about 0.01 to 0.001% $SiO_2$ per weight of metal.

In addition to this powerful action of silica in regard to grain growth obstruction with platinum metals and platinum metal alloys, it was found that silica develops under sustained high heat and at temperatures of about 900° C. and above with the platinum metal surfaces a kind of specific interaction (probably due to its strong acidic oxide character) which results in a special type of firm attachment to the surfaces of the platinum metals, and vice versa. Due to this interaction silica and platinum metals become so firmly attached to one another that they act as one when fused. Fusion separates them only in part in cases where the silica is not evenly spread out over the surfaces of the sponge powders, or, in case the mixtures have not been submitted to the characterized sustained heat-treatment preceding fusion, or, when both defects come into play. When silica is present in the amounts of about 0.3 to 0.5% per weight of metal some silica may also be separated by prolonged high frequency fusion in presence of lime linings and in case the silica was not very evenly distributed upon the sponge surfaces. But fusion removes very little of those amounts which have been specified as the preferred and amounts ranging from 0.01 to 0.20% $SiO_2$ per weight of metal. And it takes numerous repeat fusions to eliminate by means of fusion the silica to the degree that a substantial fading out of the grain stabilization as effected by minute amounts of silica may be observed.

This property of silica to become firmly attached to the platinum metals and platinum metal alloys surfaces under sustained high heat and while in a finely divided condition and evenly spread upon these surfaces and while acting as one with the metals when fused, has now substantial advantages with regard to manufacturing the silica grain stabilized metal compacts. Due to this property the manufacture of these metal compacts is no longer limited to the costly Wollaston powder metal method; their manufacture can also be effected by means of fusion.

For compacting by means of the powder metal method all those standard metal sponge powders can be applied which are known to start from metal sponge as it is produced by means of the low temperature sponging procedures, about 450 to 600° C., and which carry then, in accordance with this invention, the incorporated silica in highly dispersed but still loosely attached form, due to the low temperature sponging procedure. During the course of the usual high temperature powder metal compacting procedures, such as pressing, forming, and sintering, the silica becomes, however, firmly attached to the platinum metal surfaces.

For compacting by means of fusion the metal sponge powders which carry the incorporated silica in the highly dispersed form are required to be submitted to sustained high temperature heating preceding fusion. Such sustained high temperature heating requires temperatures of about 900° C. and above. It may be applied during the manufacture of those platinum metal sponges which hold already the silica agent by simply raising the temperature to the required level at the end of the sponging procedure, or, by incorporating the silica agent into the sponge powders which had been produced by low temperature sponging procedures (at about 450 to 600° C.) and by heating these sponge powders to the required heat, or, by incorporating the silica agent into sponge powders of low temperature ignition origin, by fabricating briquettes or pellets of small size from the resulting sponge powders, and by submitting these briquettes to sustained heat at about 900° C. and above. Fusion is best effected with either of these heat treated metal sponges when they are finally fabricated into pellets or briquettes and fed into the crucible in that form.

Both procedures for compacting platinum metal powders with the silica agent as grain stabilizer produce types of compacted metal which share equally the advantageous properties that grains are stabilized with regard to grain growth. But the use of silica adds another manufacturing advantage over thoria grain stabilization. Both types of compacted metal lend themselves to reworking by means of fusion. The thoriated platinum metal compacts can be manufactured only by means of powder metal methods, and the thoriated fabricating scrap requires that platinum metals be recovered by means of chemical scrap refining before the costly platinum metals can be of further use, since fusion of thoriated fabricating scrap removes the thoria agent in the shape of thoria skin and thus destroys its usefulness. Therefore, thoriated platinum metal compacts always require for manufacturing and fabricating very substantial investment in precious metal. Both silicated compact types as produced in accordance with this invention can be reworked by means of fusion, and, subsequently they offer the great advantage over thoriated compacts that their manufacture can be accomplished with a smaller metal stock and a smaller money investment. The same applies to fabricating.

This advantage of the silicated platinum metal compacts and their property to stand fusion solves still another important fabricating problem with grain stabilized platinum metals and alloys. In case, during fabrication it is found necessary that the silica grain stabilizing agent be present in greater amount than with the compacts as kept in stock, any deficiency in silica can be met by remelting the stock on hand and by adding, during fusion, sponge powder pellets (briquettes) which carry the silica constituent in larger amount than the metal on hand and also in such shape that the silica is already firmly attached to the metal surfaces by means of the characterized sustained high temperature heating. In a similar way can compacts with high silica content be modified to moderately grain stabilized compacts by repeat melts and by adding during fusion metal which is substantially free from silica.

In regard to the amounts of silica grain stabilizer to be used with a variety of platinum metals as well as alloys thereof, such as pure platinum, or pure palladium, or, their great number of alloys which carry as minor constituents the platinum by-metals, wolfram (tungsten), the metals of the iron group or gold and/or silver, etc., the fact must be taken into account that there are two groups of platinum metals. The first group which comprises the metals with a high specific gravity and, therefore, small specific volume, that is, platinum, iridium and osmium; their specific gravities varying from 21.4 to 22.48. The second group which has low specific gravities varying from 12.1 to 12.4 and comprising the metals palladium, rhodium and ruthenium. The specific gravities of platinum metal alloys vary in similar manner, and also specific volumes. In order to attain with all those metal types and their alloys a consistently similar grain stabilization effect, that is, of the same type and strength, the preferable amount of silica grain stabilizer mentioned above applied varies in accordance with changes in specific volume effected by alloy constituents, the metals with small specific volumes and high specific gravities always requiring the smaller amount of grain stabilizer. When, for instance, with pure platinum .06% $SiO_2$ per weight of metal is used to produce a definite grain stabilizing effect, in order to produce the very same effect with pure palladium, about 0.10% $SiO_2$ per weight of palladium metal is required. Therefore, with platinum metals and their alloys most satisfactory grain stabilization will be produced when the grain stabilizer constituent is used in proportion to the specific gravities of the metal constituents, the high specific gravity metal constituents requiring the smallest amount of grain stabilizer and the low specific gravity metal requiring the greater amount per weight of metal used.

The property of silica (silicon oxide, $SiO_2$) to act as grain stabilizer with platinum metals and platinum metal alloys as described above is not substantially changed or impaired by using silica mixed with small amounts of other refractory oxides of the acidic oxide type and which are known to mix well with silica, such as boron trioxide, titanium oxide, zirconium oxide, etc., and which are well known to be able to produce modifications of quartzglass due to their still strong acidic character, provided they are added to silica in small amount only.

With regard to the methods of effectively incorporating the silica grain stabilizer into platinum metals and platinum metal alloys there are several ways to accomplish the even dispersion of this agent. It is best accomplished by means of a washed silica hydrogel (a commercial product), that is, hydrated silica which is easily reverted with water into liquid, the sol, or by means of the commercial silica sol which is fabricated by reverting the washed hydrated silica gel into the sol using small amounts of the ammonia additive and steam pressure. The required amount of any of these silica sol liquids is intimately mixed with the metals while they are still in the finely divided state as required for powder metal compacting. Such finely divided metals of the platinum metal group are obtained by means of direct precipitation ("Black" state), or, by means of chemical compounds as produced through precipitation or other chemical procedures and their subsequent thermal decomposition (generally called "sponging") at moderate temperatures, about 450 to 600° C., or, decomposition by means of a reducing atmosphere, usually of hydrogen. The resulting mixtures are dried and, after drying, compacted and sintered in the usual powder metal procedure, or, they are compacted into pellets or small briquettes for the soaking high temperature heating at temperatures of about 900° C. and above followed by the compacting by means of fusion.

Another way of effectively incorporating the silica agent by means of washed silica hydrogel is, to mix the required amount of this liquid into the chemical compounds from which the metal is precipitated, to dry these mixtures, and to submit them to "sponging" at the moderate temperatures of about 450 to 600° C., or, to submit them to decomposition in presence of a reducing atmosphere (hydrogen). Through this method very firm attachment of dehydrated silica to any platinum metal is effected. Such firm attachment is the result of the action of silica surfaces upon platinum surfaces and vice versa while in the nascent state and in extreme dispersion.

A third way of incorporating the silica agent is by means of coprecipitation. The platinum metal chloride solutions which regularly serve to produce those well-known precipitates by means of the ammonium chloride precipitator, such as ammonium chloroplatinate and ammonium chloroiridate, produce also the precipitation of hydrated silica gel when there is added the required amount of silicic acid preceding the precipitation of the platinum metal compounds. These solutions can be provided with the required amount of silicic acid either by means of a solution of sodium silicate, or, by means of washed silica hydrogel reverted with water into liquid. Coprecipitation of silica gel from such solutions is best effected from cold and rather concentrated solutions (50 to 100 gram platinum per liter), and by adding the precipitator (ammonium chloride) in solid state at first while stirring, and by adding, finally, the precipitator as a cold concentrated solution of ammonium chloride.

On heating these ammonium chloroplatinate or ammonium chloroiridate precipitates which carry also the hydrated silica gel through the method of coprecipitation, a metal sponge is obtained which holds the silica in the state of even dispersion throughout the sponge metal surfaces. They are firmly attached to one another. This firm attachment is the result of their reaction upon one another while they were under heat and in the nascent state. The products as produced by means of coprecipitation and with the subsequent low-temperature sponging procedure lend themselves well for powder metal compacting. However, these products can in addition be compacted into small pellets or briquettes and submitted in this state to the soaking heat-treatment at about 900° C. and above, and thereafter the metals can be compacted by means of fusion for fabrication. The method of silica incorporation by means of coprecipitation is also very useful in the manufacture of metal stock with high silica content for re-alloying use with fabricating scrap. When it is desired to manufacture platinum metal alloys with platinum and/or palladium predominating, and with iridium, rhodium, ruthenium and/or osmium, and/or wolfram (tungsten) as minor constituents the difficulty often arises that the commercial metal powders of these minor constituents are rarely in that finely divided condition as required for the powder metal methods, especially to be properly mixed with the platinum or palladium metal powders with any success of even dispersion. They are not even in a condition to mix well with liquid platinum or palladium, during fusion. This lack of fine subdivision with these metals is due to the fact that they are usually produced from chlorides or oxides by means of reduction. These chlorides and oxides are usually in an extreme state of subdivision. But, the very moment they are treated with hydrogen they react with the hydrogen so intensely that the metals form with a great evolution of heat, and the original fine structures of the chlorides or oxides collapse suddenly with an additional release of heat. Thus highly sintered and coarse grained metals are formed. With such coarse grained by-metals or wolfram (tungsten), the even dispersion in platinum and palladium powders becomes not only a major problem but likewise does the dispersion of the silica agent. It has now been found that both problems find a simple solution by mixing the regular platinum and palladium powders of low temperature origin with the required amount of finely divided by-metal chloride or by-metal oxide powder, or with both, or with wolfram oxide powder, adding to this mixture the required amount of silica hydrogel liquid which is evenly dispersed within this mixture, drying the resulting mixture and finally treating with hydrogen while under heat at about 200 to 400° C. with the by-metal compounds, and about 700° C. with wolfram (tungsten) oxide. The resulting powder metal products are ready to be compacted by means of the usual powder metal methods. The products can also be compacted by means of fusion after they have been compacted into pellets or small briquettes and been submitted to the characterized soaking anneal at about 900° C. and above, and in presence of hydrogen to avoid oxidation of by-metals and of wolfram (tungsten).

Minute amounts of silica may also be incorporated into new metal while this metal is fused by adding dehydrated silica gel, quartz, or cristobalite into the liquid metal, however, none of the fusion methods works satisfactorily as liquid silica is always rapidly formed on the fused metal; while it is floating on the liquid metal it is consumed at a high rate by the lime lining of the furnace, and sorbed at a very low rate by the fused metal.

The incorporation of acidic oxides other than silica into platinum metal powders and mixtures thereof can be made by way of the same mixing procedures as outlined above. The required amount of grain growth impeding agent may be provided in the form of the hydrosol of titanium acid, boric acid solution, etc. As mentioned before, these acidic oxides and others becomes useful when used in mixtures with silica and when the silica is made the predominating constituent.

The platinum metal compacts as manufactured in accordance with this invention by means of fusion or any type of powder metal method have the same characteristics as those known metal compacts which carry a definite amount of heterogeneous inclusions as grain growth controlling constituents. In the hard-worked as well as in the annealed state they are mechanically harder than the homogeneous counterpart alloys. This hardness is an inherent hardness, and it is of a type that when the cold worked metals are submitted from moderate to high heat annealing their hardness undergoes only small changes; it drops only at a very low rate, even with the relatively high temperatures. This is different from the sudden drop in hardness as experienced with the homogeneous counterpart metals and alloys at the relatively small temperature range, commonly called the annealing temperature of the metal. Because of this great difference in behaviour during high temperature exposure, the temperature range at which this special behaviour is in evidence, is often referred to as the sphere of (relative) heat stability. This sphere of heat stability spreads with the strongly silicated metal compacts over a range of about 600 to 700° C. above which point the homogeneous counterpart alloys turn rather suddenly into soft metals, as they are today generally called.

The heat stability of these compacts is the direct result of the heterogeneous silica inclusion. It is most pronounced in the present case with inclusions which range from about 0.20 to 0.06% per weight of metal. However, as was mentioned, silica is still powerfully acting with substantially smaller amounts, such as 0.05 to 0.001% per weight of metal. With such small and even minute amounts of silica inclusions the change in hardness during annealing is modified, as the changes become gradually more pronounced. But the changes are still gradual over a relatively wide temperature range.

The other mechanical properties of these compacts follow practically the same trend as hardness with rising temperature. Tensile strength decreases at a low rate, gradually also. Elongation develops very slowly with the lower temperatures; at higher temperatures it increases at higher rates. But elongation never reaches values of the type as produced with metals which are free from silica inclusions at these higher and even with the highest temperatures. Grain growth becomes, of course noticeable with those temperatures which are at the upper end of the temperature range characterized above as the sphere of heat stability. The appearance of grain growth is indicated when the mechanical properties enter the sphere of more drastic changes in contrast to the small and gradual changes within the temperature range of the relative heat stability. When, however, by chance or otherwise, the grain stabilized compacts are made to become "getters" for base metals while in use at temperatures which are within the sphere of heat stability, no such sudden, damaging exaggerated grain growth is experienced as with the homogeneous counterpart metals and alloys. The chemical action which is at the bottom of every such "getter action" stays locally limited due to the presence of the heterogeneous silica inclusions at the grain surfaces of the metal.

The same applies all the way through to those moderately grain stabilized platinum metals and platinum metal alloys which are made in accordance with this invention with the small and minute amounts of silica inclusions of about 0.05 to 0.001% $SiO_2$ per weight of metal. The changes due to high temperature exposure follow higher rates but continue to be gradual. These compacts stay grain stabilized still over a range of about 300 to 600° C.

Such moderately grain stabilized platium metal compacts are of special importance in the manufacture of platinum metal gauze catalysts, special types of electric contacts which involve catalytic properties of these metals during electrical contact performance, ignition wires, and in the manufacture of platium ware for high temperature ignition use. Due to the small and minute amounts of silica the metal compacts are modified into metal types with a high ductility and, therefore, lend themselves as well to the fabrication of thin wire, thin wire gauze, all kinds of intricately shaped platinum ware as the metals do which are free from heterogeneous grain growth obstructing inclusions. But due to the presence of the small amount of heterogeneous silica inclusions very minute crystal grains are produced by means of the proper cold work and proper between anneals, and, on heating the finished article to the the temperatures as required for the technical use, this minute grain operates free from any tendency to grow during use. Since catalyst performances are to a very high degree the result of grain size and grain surfaces, and catalyst performance is enhanced by small grains and by the subsequent increase in grain surfaces, the presence of the moderate and minute amounts of silica becomes an efficient means in fabricating improved wire gauze and other type of compact metal catalyst for high temperature use. The same applies to ignition wires, electrical contact points, etc.

The metal compacts of the present invention can be hot and cold worked with between anneals, or both, that is, the initial hot working of the rather thick compacts can be continued by cold working the small size compacts. However, it was found that best fabricating results are attained when the cold or hot working of compacts of any origin (fusion and casting, or, powder metal methods) is preceded by soaking anneal at those temperatures most suitable for between anneals or hot work. This soaking anneal is required to precede any cooling to room temperature. And, as was also found, any type of hot work is best performed by letting the "cast" cool from its high manufacturing temperatures to the temperature most suitable for forging, rolling, swaging, etc.

The temperatures most suitable for the soaking anneal preceding the cold or hot working of compacts, for the between anneals, and for the hot working vary from about 500 to about 900° C. The lower temperature range from about 500 to 650° C. applies to the silica grain stabilized platinum or palladium and their binary allows. However, as other constituents are added to these metals and alloys, and in increasing amounts, such as the platium group by-metals, or, wolfram (tungsten), or metals of the iron group, the temperature range from about 650 to about 900° C. becomes applicable. The specified temperature ranges comprise the temperatures which effect the normal recovery and relief of internal stress with the metals and alloys of this invention after any type of cold or hot work while they are free from grain growth obstructing substances. The heat as transferred at these relatively low temperatures produces the same effect with the grain stabilized compacts of the present invention. It keeps the total energy of grain boundary surfaces at a relatively constant high level, and the elongation and ductility properties of the compacts are consistently kept at the state which makes these properties tend to increase towards a maximum value but never to go beyond the point which is known as the peak of these favorable properties. In other words, this low temperature heat-treatment carefully keeps the tendency of crystals to grow in a dormant state. The heat applied during fabricating procedures never aims to be of a kind that recovery of a type is effected which would decrease the elongation and ductility properties of the metals used, and which would bring to life any tendency of small crystals to grow. Such tendency would, as was found, invite "secondary recrystallization" in case the screen of the grain growth obstructing substances is accidentally removed from grain boundary surfaces during hot work or otherwise. Embrittlement of the compacts would ensue during subsequent cold or hot work.

Hot and cold working of the metal compacts as produced in accordance with the present invention into sheet, foil, wire, etc. can be accomplished in the usual manner with total area reductions from about 40% upwards. Preferable area reductions with regular types of compacts are from about 40 to 75%, total. However, with those moderately grain stabilized compacts which carry from about 0.05 to 0.001% $SiO_2$ per weight of metal and when these compacts are required to be fabricated into catalysts, or, into electrical contacts required to produce also catalytic properties in addition to the electrical performance, etc., total area reductions of at least 99% were found to produce best performance. A preferable way to produce the best performance with catalysts and electrical contact bodies is to apply an area reduction of at least 98% preceding the final area reduction of at least 99%.

The following specific examples serve to illustrate the present invention but are not intended to limit the same:

Example I 25 ozs., or, 777.5 grams pure platinum sponge or platinum sheet are dissolved in aqua regia in the usual manner. The resulting solution is evaporated, treated with water and a small amount of hydrochloric acid, evaporated again, also as usual, to ensure the elimination of nitrous compounds. Finally, the last evaporation residue is once more taken up with hydrochloric acid about ½ normal, and evaporated on the steam bath until the acid is expelled. After the last evaporation the dish is set aside for cooling.

In the meantime a sodium silicate solution is prepared, 1/50 normal, by means of commercial pure silicate, such as the 40 to 42° Bé. silicate. This 1/50 normal sodium silicate solution carries per liter .783 gram silicic acid, or, 0.06 gram $SiO_2$. To provide 25 ozs., or, 777.5 grams of platinum with about 0.06% $SiO_2$ per weight of metal, about 0.47 gram silica are required, or, about 780 cc. of the above 1/50 normal silicate solution.

Into the cold syrupy chloroplatinic acid are, therefore, carefully stirred 780 cc. of the above 1/50 normal sodium silicate solution. The resulting mixture is once more evaporated on the steambath to stiff paste consistency, and is again put aside for cooling. After cooling, the mixture is taken up with about 9 liters of water to produce a solution to contain about 70 to 80 grams platinum. This solution is treated with solid ammonium chloride. The ammonium chloride powder is stirred into the solution in suitably small quantities. As soon as this leads to an unduly thick precipitate, concentrated ammonium chloride solution is added instead of the solid ammonium chloride. After 1 to 3 hours standing the precipitate is drained, washed with a 20% solution of ammonium chloride, dried and ignited to sponge.

The ammonium platinumchloride thus produced carries the silica in the form of hydrated silica gel. Hydrated silica gel is co-precipitated with the platinum salt. The ammonium platinumchloride is ignited at the moderate temperatures of about 450 to 600° C., and the resulting sponge is carefully ground, sieved, washed, dried, etc. in accordance with the known powder metal methods for platinum (see, Powder Metallurgy, J. Wulff, 1942, page 16), and is finally packed into steel molds, compressed with a pressure of about 7 to 10 tons per square inch, and is sintered at about 1100° C. to 1400° C. After sintering, the compacts are transferred for the soaking anneal to a furnace which is held at the temperature of about 650 to 700° C., are kept there for at least 30 minutes. After this soaking anneal the compacts are hot forged, or, hot rolled, etc. and finally cold rolled or drawn according to fabricating requirements with between anneals never above about 700°, preferably at about 600 to 650° C.

Example II

Silicated C. P., that is, chemically pure platinum sponge is manufactured according to Example I. The required amount of silica, about 0.06% per weight of metal is incorporated, as outlined in Example I, by co-precipitating hydrated silica gel together with the ammonium platinumchloride. The ignition of the mixture of precipitates is carried through the low-temperature range of about 450 to 600° C. to the higher temperatures of about 900 to 1100° C. The resulting sponge is ground, washed, dried, made into small briquettes or pellets by means of a power-operated pelleting machine. The resulting pellets are fed into a high-frequency furnace crucible, are gradually heated to about 1400 to 1600° C. and are kept at this heat for about 15 to 20 minutes. After this special high-temperature heat treatment the pellets are quickly fused and the metal is cast into graphite molds (wire or sheet metal molds). While still white hot the ingot is removed from the graphite mold and is transferred to a furnace held at about 550 to 650° C. The ingot is kept there for about 30 to 45 minutes and then cooled to room temperature for cold working, or, the ingot is hot forged to a shape required for subsequent fabricating by cold work. After the hot forge another soaking anneal at about 550 to 650° C. is applied before the hot forged bar is slowly cooled for cold work to manufacture sheet, wire, tubing, etc. All between anneals are made at about 550 to 650° C.—C. P. platinum as manufactured by this method is substantially harder than C. P. platinum which is free from silica. When fabricated into foil such foil stays hard, springy, etc. even when annealed to temperatures up to approximately 1500° C.

Example III

Palladium sponge is manufactured by dissolving commercial palladium sheet in dilute aqua regia (1 vol. $HNO_3$, specific gravity 1.42; 4 vol. HCl, specific gravity 1.18; and 4 vol. water). The resulting solution is treated in the usual manner with sufficient ammonium chloride and concentrated nitric acid to produce the ammonium chloropalladate precipitate by digesting on the steam bath. The filtered and washed precipitate is dried. After drying, an amount of this precipitate is separated which corresponds to about 25 oz., or, 777.5 grams palladium metal.

This powder is mixed with a colloidal silicic acid solution (sol) which is 1/50 normal. 1300 cc., corresponding to .78 gram $SiO_2$, or, 0.10% $SiO_2$ per weight of palladium metal are transferred to the dried ammonium chloropalladate powder. The silicic acid sol is prepared by mechanically mixing the commercial silica hydrogel (which is substantially free from alkali) with water.

The 1300 cc. of the silicic acid sol are incorporated into the ammonium chloropalladate in such suitable small quantities that only an even wetting of the powder is effected. The wet powder is dried on the steam bath. This procedure is repeated until the full amount of the sol is introduced into the ammonium chloropalladate.

After final drying the sponging (ignition) of the mixture is effected by gradually heating the same to about 500 to 600° C. In the presence of air such low temperature sponging produces a "tarnished" palladium sponge due to oxidation and subsequent formation of a palladium oxide film. This "tarnish" disappears again the very moment the ignition temperatures are increased to about 900 to 1000° C., due to the thermal decomposition of the palladium oxide at these higher temperatures.

Ignition of the above mixture is gradually carried to these higher temperatures. The sponge is kept at these higher temperatures for about an hour to effect the physical interaction between palladium sponge surfaces and finely divided silica and the firm attachment of the silica film to the sponge surfaces.

The resulting highly sintered palladium sponge is difficult to transform into the fine powder. Therefore, the palladium sponge is pressed into a 3-inch diameter and half-inch thick cake applying about a 5-ton pressure per square inch. This cake is broken up into small irregular pieces fitting into a high frequency furnace crucible. They are fed into the crucible and heated to about 1300 to 1400° C., and are kept at this heat for about 30 minutes or more. After this high temperature heat treatment, fusion is effected quickly. The metal is cast as usual, into a graphite mold. While still white hot the ingot is removed from the mold and transferred to a furnace held at a temperature of about 550 to 650° C. the ingot is submitted to this heat treatment for at least 30 minutes and then slowly cooled for cold working with between anneals at about 550 to 650° C.

For hot forging or hot rolling the ingot is forged or rolled to the required size following the above soaking anneal at about 500 to 650° C.; forging and hot rolling is carried out at this temperature range. Before cooling from hot working the ingot is once more submitted to a soaking anneal at about 550 to 650° C.

Silicated pure palladium manufactured by the above method or by any of the powder metal methods is substantially harder than pure palladium free from silica. It stays hard up to about 1300 to 1400° C. Pure palladium free from silica when annealed in presence of water vapor (steam annealer), or when annealed even at the relative low temperatures of about 600 to 750° C. tends to recrystallize with a very high rate of grain growth whence large crystals are formed. This tendency of pure palladium to effect a high rate of exaggerated grain growth is killed by silicating pure palladium.

*Example IV*

22.5 ozs. platinum sponge powder, as produced from pure ammonium platinum chloride by means of low temperature ignition, at about 450 to 600° C., 3.083 ozs. rhodium oxide, $Rh_2O_3$, equal to 2.5 ozs. rhodium metal, produced in extremely fine subdivision by heating dehydrated rhodium trichloride, $RhCl_3$, at about 600° C. in presence of an oxygen atmosphere, are intimately mixed. This dry powder mixture is sprinkled with a 1/50 normal silicic acid sol to effect even wetting; this wetting is followed by drying and dehydrating at about 150 to 300° C. Sprinkling with subsequent even wetting and drying is repeated until 650 cc. of the silicic acid sol are incorporated into the powder mixture, equal to 0.39 gram $SiO_2$ or 0.05% $SiO_2$, per weight of the alloy to be manufactured.

The powder mixture is compounded into small pellets by means of a pellet machine. The pellets are transferred to quartz boats which are passed through a conveyer type furnace at about 1050° C. and in the presence of a hydrogen or cracked ammonia gas atmosphere to effect reduction of the rhodium oxide and a first high temperature treatment of the metal powders which carry the silica film.

The pellets are then transferred to the crucible of a high frequency furnace, are heated to about 1400 to 1500° C. for at least about 30 minutes to effect the physical interaction between the silica film and the metal surfaces, and the firm attachment of the silica film to the metal surfaces. During this special high temperature heat treatment no hydrogen atmosphere is required for avoiding oxidation of rhodium metal particles, since rhodium oxides cease to exist above 1050° C. in the presence of the oxygen of air.

After this high temperature heat treatment the pellets are quickly fused and cast into the usual graphite wire molds. While still white hot the ingot is transferred into a furnace which is kept at about 650 to 750° C., is left there to cool to this temperature and to be soakingly annealed at this temperature for at least 30 minutes. After this soaking anneal the ingot is hot forged and hot rolled to about .250" diameter, or, .300" diameter, respectively.

In order to fabricate the fine wire for the gauze catalyst manufacture the following procedure is now best applied:

For fabricating the .003" wire the .250" diameter rod is, after another soaking anneal at about 650 to 750° C. and slow cooling, through cold rolling cold swaging, and cold drawing made into a wire of .030" diameter. This amounts to a total area reduction of 98.5%. The wire is now submitted to another soaking anneal for about three hours at about 650 to 750° C., preferably by means of an electric furnace and in the presence of air. After this anneal, which is the last between anneal, the wire is drawn in the usual manner to the finished size of .003" diameter. This procedure of cold working amounts to a total area reduction of 99.0%.

For fabricating the .0024" wire, the .300" diameter wire rod is, after another soaking anneal at about 650 to 750° C., brought to the size of .150" by means of cold rolling, cold swaging and cold drawing. At the size of .150" the wire is annealed for about three hours at about 650 to 750° C. in an electric muffle furnace in an air atmosphere. After this first 3-hour soaking anneal the wire is cold drawn from .150" to .025". At this stage another 3-hour anneal at about 650 to 750° C. is applied. This is the last between anneal. From the .025" size the wire is in the usual manner cold drawn to the finishing size of .0024". Therefore, with this last fabricating procedure total area reductions of 75%, 98.5% and 99.1%, respectively, are applied.

The wire surfaces have to be kept clean all the way through, especially through the very final procedures. To assure clean surfaces of the final product, chemical surface pickling of wires by means of a dilute but buffered aqua regia solution is a best means to attain this aim, when the buffering is accomplished by means of sodium chloride or ammonium chloride. Wire surface cleaning by means of chemical surface pickling is best accomplished at the stage where the cold swaging changes to cold drawing. Any annealing required for finished wires for the final gauze manufacture can apply temperatures varying from about 450 to 650° C.

Wire gauzes fabricated from the above silicated platinum-10% rhodium alloy and by means of the method of fabrication of wire as outlined excel the regular, non-silicated alloy in regard to the ease the catalytic performance is initiated, in regard to conversion rates and useful catalyst life.

The high specific gravity platinum-iridium alloys have been to a high degree replaced by the ternary alloys comprising palladium, ruthenium and platinum. The alloys of this group lend themselves well to produce alloys with low specific gravities since the hardening and contact performance improving constituent (ruthenium) belongs also to the low specific gravity platinum metal group. The alloys found most useful for supreme electrical contact performance range about as follows:

| Platinum | Palladium | Ruthenium | Spec. Gravity | Percent $SiO_2$ |
| --- | --- | --- | --- | --- |
| 77 | 13 | 10 | 18.2 | .071 |
| 62 | 28 | 10 | 16.6 | .078 |
| 50 | 40 | 10 | 15.5 | .083 |
| 40 | 52 | 8 | 14.7 | .088 |
| 30 | 64 | 6 | 13.9 | .092 |
| 20 | 76 | 4 | 13.3 | .097 |
| 10 | 88 | 2 | 12.7 | .101 |

As outlined in the specification, the grain stabilization by means of silica is best effected with such alloys when the grain stabilizer constituent is applied in proportion to the specific gravity changes effected by the metal constituents, that is, the high specific gravity alloy is provided with a smallest amount of grain stabilizer, and this amount is increased as the specific gravity decreases. This is indicated in the last column of the above table.

The silicated alloys of this group can best be produced as follows, for instance:

*Example V*

25 ozs. silicated platinum metal as manufactured by means of the method of Example I or II and 20 ozs. silicated palladium metal as produced in accordance with Example III, are fused together with 5 ozs. commercial ruthenium powder. The resulting alloy is cast into a graphite mold; while still white hot the ingot is transferred to a furnace held at a temperature of about 550 to 750° C.; the ingot is kept there to slowly cool to this temperature and to be kept there also for an additional soaking anneal at this temperature; this soaking anneal to be applied for at least half an hour. The bar is now hot forged and hot rolled to about .100″, in case it is a sheet metal bar. This hot rolling is followed by another soaking anneal at about 550 to 750° C., for about half an hour and by slowly cooling to room temperature. Cold working, such as cold rolling is accomplished with strong individual passes, but in such manner that reductions per pass increase with each individual pass. Between anneals total reductions of about 75% are applied and the between anneals are made at about 550 to 750° C., and from about one-half to two hours.

The foregoing examples illustrate some of the modifications of my invention in regard to what is generally termed the commercial pure platinum (used in various shades for ware fabricating, alloying, etc.); the C. P., that is the chemically pure platinum which is used for thermocouple wires etc.; the commercial pure palladium which is used for alloy manufacture, compact metal catalysts, etc.; the platinum-10% rhodium alloy for gauze catalyst fabricating; and, the platinum-palladium-ruthenium alloys which are used with electrical contact fabricating, etc. However, the invention is applicable to fabrication of other grain stabilized metals, such as: the many other varieties of the platinum-rhodium alloy group used for fabricating special platinum ware, catalysts of various shapes, spinnerettes for the glass spinning procedures, ignition wires, wires and foils for heating elements. These alloys contain up to about 40% rhodium. The platinum-iridium alloys with iridium contents up to about 30%, are used for electrical contacts, and tubings for hypodermic needles. The platinum-osmium-ruthenium alloys with osmium contents up to about 7%, and ruthenium contents up to about 5%, are used for electrical contacts and tubing in hypodermic needle fabrication. The platinum-wolfram alloys with up to about 6% wolfram, are replacing to some degree the expensive platinum-iridium alloys for electrical contacts. The platinum-ruthenium alloys, and the palladium-ruthenium alloys, with up to about 11% ruthenium also are replacing platinum-iridium alloys for electrical contacts. The platinum-nickel alloys, the platinum-cobalt alloys, the platinum-iron alloys with up to about 6 to 9% of the metals of the iron group, are occasionally used for electrical contacts, ignition wires, catalysts, etc. The platinum-gold alloys with up to about 6% gold are used for special platinum ware, thermocouple wire, etc. The other chemically pure platinum metals of the platinum metal group such as rhodium, iridium, palladium, and their alloys with C. P. platinum, are used for thermocouple use and other uses in connection with research work, etc.

It has also been found that the principle, methods and procedures as outlined above with regard to the platinum metals and their alloys can also be applied to produce grain stabilized nickel and nickel alloys. Nickel and nickel alloys are similar in many respects to the platinum metals and their alloys, and the difficulties experienced with the platinum metals and alloys are found with nickel also.

Although silica was mentioned as the preeminent grain stabilizer of the acidic oxide group being substantially as refractory as the metal compacts for which it is used, being the most powerful agent of this type, and acting with the advantages characterized above, especially with regard to methods of compacting and scrap reworking, I wish it to be understood that other acidic oxides may be used in mixture with silica in which silica is the main constituent. As to the amounts of grain stabilizer used with the above examples, the invention wishes in no case to be limited to the proportions described in the examples.

The way of bringing the constituents together may be varied in many other ways than shown by these examples, especially the way varieties of finely divided metals are prepared preceding the incorporation of silica, the pressures used for compounding the powder mixtures for making powder metal compacts, or pellets, or briquettes preceding sintering and/or forming to attach the silica film to the metal surfaces, the length of time used for sintering, for soaking anneals at the normal annealing temperatures preceding hot working, or, for between anneals preceding cold work.

Since metal compacts are as well formed by means of powder metal methods as by means of fusion procedures, the concept "compact" applies in the specification as well as in the claims to the final product of both compacting procedures. With regard to compacting by means of powder metal methods, the method may be applied by incorporating the required amount of silica by dusting the metal powders with impalpable silica gel powder preceding the pressing step used in the powder metal methods.

The expression "normal annealing temperature" as used in the specification and in the claims refers only to that temperature range which was characterized in the specification and which comprises only that low temperature range which effects with the normal metal compacts, which are free from any grain stabilizing substance, the normal recovery from cold work.

The silicated pure platinum metals and the platinum metals alloys as produced in accordance with my invention are useful for any high temperature use for which platinum metals and alloys thereof are expected to excel in safe service, highest corrosion resistance even when exposed accidentally or otherwise to "getter actions," highest performance rates, prolonged useful life. They are supreme performers as electrical contact points, as gauze catalysts, as thermocouple wires, ignition wires, platinum ware for ignition use, and they will invite the use of platinum metals and alloys for more industrial uses where high temperature stability is required.

It will be obvious to those skilled in the art that various changes may be made without departing from the spirit of the invention and therefore the invention is not limited to what is described in the specification but only as indicated in the appended claims.

I claim:

1. A grain stabilized metal composition in which at least the surfaces of the particles therein are fused together consisting of a metal and silica, the proportion of the silica being from .001% to 2.5% of the weight of the metal, said metal comprising at least one of the metals of the platinum group as a major constituent.

2. A grain stabilized metal composition according to claim 1 in which a mixture of acidic oxides, silica being the major constituent of the mixture is substituted for the silica.

3. A grain stabilized metal composition as claimed in claim 1 in which the metal is platinum and the silica is in the proportion of from 0.001% to 0.10% of the weight of the platinum.

4. A grain stabilized metal composition as claimed in claim 1 in which the metal is an alloy of platinum and rhodium wherein the platinum is the major ingredient and the rhodium does not exceed 50% of the weight of the alloy and the silica is in the proportion of from 0.001% to 0.2% of the weight of the alloy.

5. A grain stabilized metal composition as claimed in claim 1 in which the metal is an alloy of platinum and wolfram wherein the platinum is the major ingredient and the wolfram does not exceed 6% of the weight of the alloy and the silica is in the proportion of from .001% to 0.10% of the weight of the alloy.

6. A grain stabilized metal composition as claimed in claim 1 in which the metal is an alloy of platinum and nickel wherein the platinum is the major ingredient and the nickel does not exceed 6% of the weight of the alloy and the silica is in the proportion of from .001% to 0.20% of the weight of the alloy.

7. A grain stabilized metal composition as claimed in claim 1 in which the metal is an alloy of platinum, palladium and ruthenium, platinum varying from 77% to 10%, palladium from 13% to 88%, ruthenium from 10% to 2%, and the silica is in the proportion of from 0.01% to 0.20% of the weight of the alloy.

8. A grain stabilized metal composition as claimed in claim 1 in which the metal is an alloy of platinum, palladium and ruthenium, platinum varying from 77% to 10%, palladium from 13% to 88%, ruthenium from 10% to 2%, the specific gravity of the resulting alloy varying from 18.2% to 12.7%, and the silica is in the proportion of from 0.01% to 0.20% of the weight of the alloy, the amount of silica varying with the specific gravity of the alloy, a smaller amount of silica being used with the high specific gravity alloy and a larger amount as the specific gravity decreases.

9. A grain stabilized sintered metal compact consisting of a metal and silica, the proportion of the silica being from .001% to 2.5% of the weight of the metal, said metal comprising at least one of the metals of the platinum group as a major constituent.

10. A grain stabilized metal composition in which at least the surfaces of the particles therein are fused together consisting of a metal and silica, said metal portion comprising at least one of the metals of the platinum group as a major constituent, the proportion of silica varying from about 0.001 to 0.20% of the weight of the metals, the amount of silica varying with the specific gravity of the metal or alloy, a smaller amount of silica being required with higher specific gravity metals or alloys and a larger amount of silica being required as the specific gravity decreases.

11. A grain stabilized metal composition in which at least the surfaces of the particles therein are fused together consisting of a metal and silica, the proportion of the silica being from 0.017% to 0.20% of the weight of the metal, said metal comprising at least one of the metals of the platinum group as a major constituent.

12. A process for producing a grain stabilized sintered metal compact comprising incorporating .001% to 0.500% silica per weight of metal into a metal sponge powder comprising at least one of the metals of the platinum group as a major constituent, compacting the resulting mixture by means of compression, and sintering the pressed compact at 900 to 1600° C.

13. A process for producing a grain stabilized metal composition comprising incorporating silicic acid sol in proportions of .001% to 0.500% $SiO_2$ per weight of metal into a metal sponge powder in finely divided form comprising at least one of the metals of the platinum group as a major constituent, dehydrating the mixture, reacting the mixture by heating to the temperature range of about 900 to 1600° C., fusing the reacted mixture, and casting the melt into molds.

14. A process for producing a grain stabilized metal composition comprising incorporating silicic acid sol in proportions of 0.001% to 0.500% $SiO_2$ per weight of metal into a metal sponge powder in finely divided form comprising at least one of the metals of the platinum group as a major constituent, dehydrating the mixture, reacting the mixture by heating to the temperature range of about 900 to 1000° C., compacting the mixture into small pellets, reacting the pellets by heating to the temperature range of about 1400 to 1600° C., fusing the reacted mixture, and casting the melt into molds.

15. A process for producing a grain stabilized sintered platinum compact comprising incorporating sodium silicate into syrupy chloroplatinic acid in proportions equivalent to about .001% to 0.50% $SiO_2$ per weight of dissolved metal, coprecipitating from this solution ammonium platinum chloride and hydrated silica gel by means of ammonium chloride as precipitator, igniting the precipitate to the finely divided sponge condition at 450 to 600° C., compacting the silicated platinum sponge by compression, and sintering the pressed compact at 900 to 1600° C.

16. A process for producing a grain stabilized platinum composition comprising incorporating sodium silicate into syrupy chloroplatinic acid in proportions equivalent to about 0.001 to 0.50% $SiO_2$ per weight of dissolved metal, coprecipitating from this solution ammonium platinum chloride and hydrated silica gel by means of ammonium chloride as precipitator, igniting the precipitate at 900 to 1100° C., compacting the mixture into small pellets, heating the pellets to the temperature range of 1400 to 1600° C., fusing the pellets, and casting the melt into molds.

17. A process for producing a grain stabilized platinum-rhodium composition suitable for use as a gauze catalyst comprising mixing finely divided platinum sponge powder and less than 50% of rhodium in the form of rhodium oxide powder, incorporating into the mixture silicic acid sol in the proportion of 0.001% to 0.50% $SiO_2$ per weight of metals, dehydrating the mixture, compacting the mixture into small pellets, heating the pellets in the presence of hydrogen at a temperature ranging from 750 to 1050° C., continuing the heating to 1400 to 1600° C. without the hydrogen, fusing the heated mixture, and casting the melt.

18. A process for producing a grain stabilized platinum-rhodium composition comprising incorporating sodium silicate into syrupy chloroplatinic acid in proportions equivalent to 0.001% to 0.50% $SiO_2$ per weight of the resulting alloy, co-precipitating from this solution ammonium platinum chloride and hydrated silica gel by means of ammonium chloride as precipitator, dehydrating the precipitate, incorporating less than 50% of rhodium in the form of rhodium oxide powder, compacting the mixture into small pellets, heating the pellets in the presence of hydrogen at a temperature ranging from 750 to 1050° C., continuing the heating to 1400 to 1600° C. without the hydrogen, fusing the heated mixture, and casting the melt.

19. A process for producing a grain stabilized sintered platinum-rhodium compact comprising incorporating .001% to 0.50% silica per weight of the resulting alloy into platinum to obtain a silicated platinum sponge powder, incorporating less than 50% of rhodium in the form of rhodium oxide powder, heating the mixture to 200 to 300° C. in the presence of hydrogen, compacting the resulting mixture in powder form by compression, and sintering the pressed compact at 900 to 1600° C.

20. A process for annealing a metal composition comprising at least one of the metals of the platinum group as a major constituent grain stabilized by the incorporation of .001% to 0.500% silica comprising transferring a white hot ingot to a furnace maintained at the normal annealing temperature of the metal, and annealing the ingot for at least fifteen minutes after the ingot has cooled to the temperature of the furnace, said soaking anneal preceding any cooling to room temperature.

21. A process for annealing an ingot of platinum grain stabilized by the incorporation of .001% to 0.50% silica, comprising transferring the ingot while white hot to a furnace maintained at a temperature of 550 to 750° C., and annealing the ingot for at least fifteen minutes after the ingot has cooled to the temperature of the furnace, said soaking anneal preceding any cooling to room temperature.

22. A process for annealing a platinum-rhodium alloy ingot containing less than 50% rhodium and grain stabilized by the incorporation of .001% to 0.50% silica comprising transferring the ingot while white hot to a furnace maintained at 650 to 750° C., and annealing the ingot for at least half an hour after the ingot has cooled to the temperature of the furnace, said soaking anneal preceding any cooling to room temperature.

References Cited in the file of this patent

UNITED STATES PATENTS

| | | |
|---|---|---|
| 1,037,268 | Kuzel | Sept. 3, 1912 |
| 1,109,887 | Welsbach | Sept. 8, 1914 |
| 1,410,499 | Pacz | Mar. 21, 1922 |
| 1,461,117 | Hall | July 10, 1923 |
| 1,461,118 | Hall | July 10, 1923 |
| 1,552,122 | De Graaff | Sept. 1, 1925 |
| 2,030,229 | Schwarzkopf | Feb. 11, 1936 |
| 2,116,923 | Bolton | May 10, 1938 |
| 2,190,536 | Staiger | Feb. 13, 1940 |
| 2,206,395 | Gertler | July 2, 1940 |
| 2,302,980 | Stein | Nov. 24, 1942 |
| 2,315,876 | Sivil et al. | Apr. 6, 1943 |
| 2,370,242 | Hensel et al. | Feb. 27, 1945 |
| 2,406,172 | Smithells | Aug. 20, 1946 |
| 2,476,208 | Middleton | July 12, 1949 |

FOREIGN PATENTS

| | | |
|---|---|---|
| 168,025 | Great Britain | Mar. 21, 1922 |
| 543,495 | Great Britain | Feb. 27, 1942 |